Nov. 14, 1944. C. H. HODGKINS 2,362,820
THERMAL RELAY FOR STARTING FLUORESCENT LAMPS
Filed Dec. 16, 1942 3 Sheets-Sheet 1
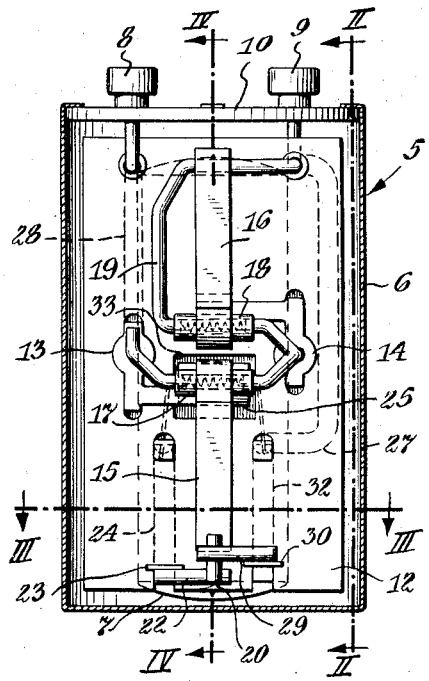
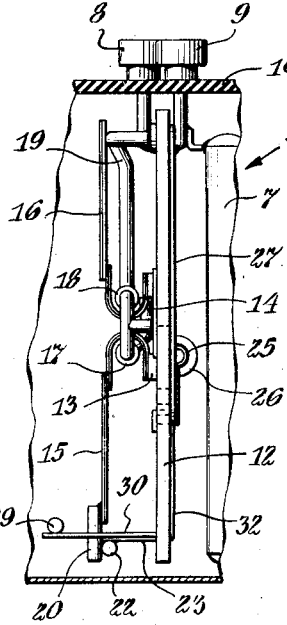
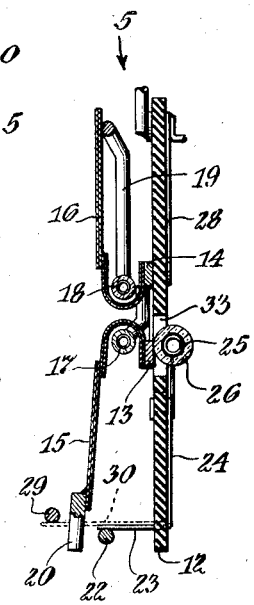
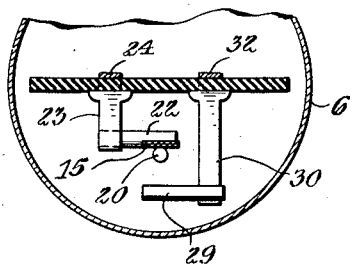
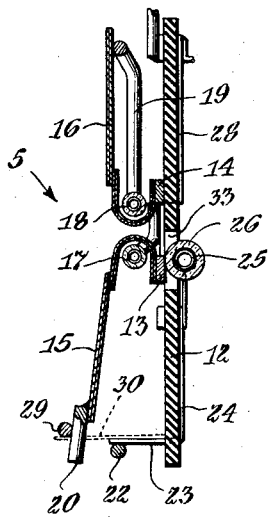
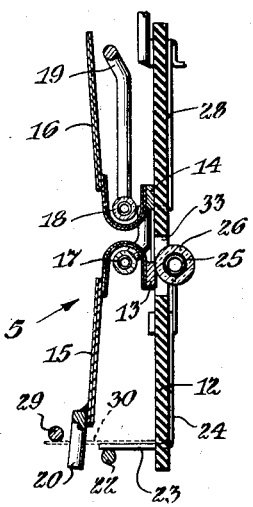
INVENTOR
C. H. HODGKINS
BY
ATTORNEY Nov. 14, 1944.   C. H. HODGKINS   2,362,820
THERMAL RELAY FOR STARTING FLUORESCENT LAMPS
Filed Dec. 16, 1942   3 Sheets-Sheet 2

INVENTORS
C. H. HODGKINS.
BY
ATTORNEY

Nov. 14, 1944.  C. H. HODGKINS  2,362,820
THERMAL RELAY FOR STARTING FLUORESCENT LAMPS
Filed Dec. 16, 1942   3 Sheets-Sheet 3
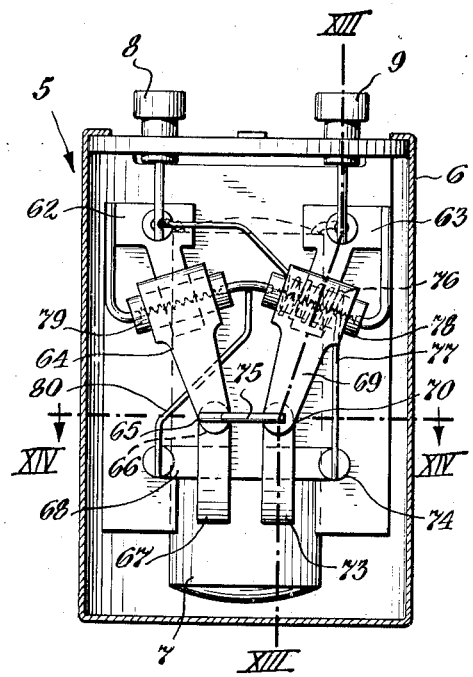
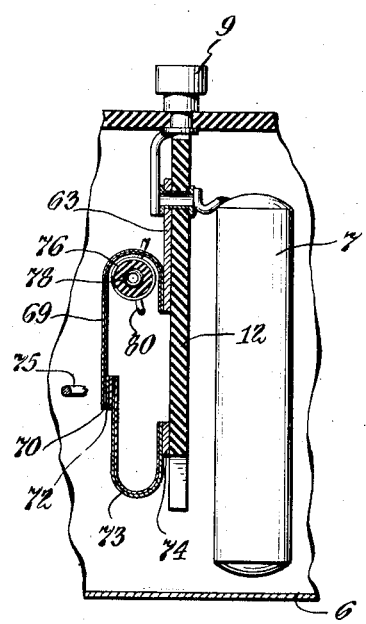
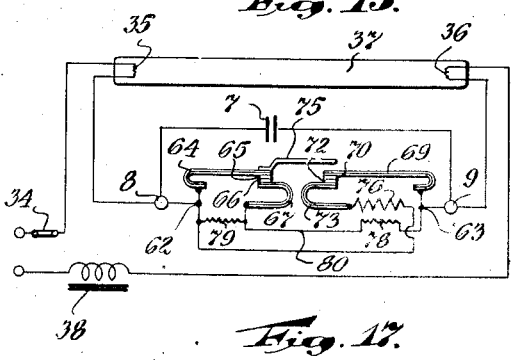
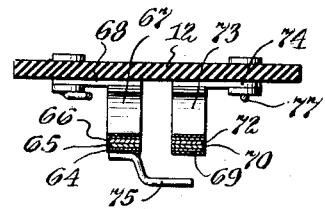
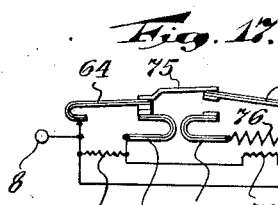
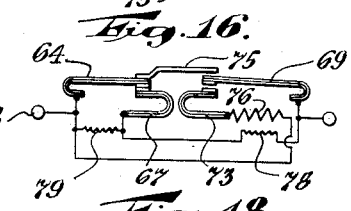
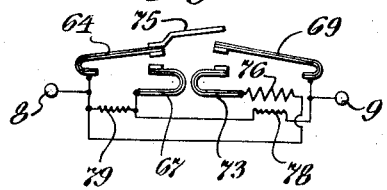
INVENTOR
C. H. HODGKINS
BY
ATTORNEY Patented Nov. 14, 1944

2,362,820

UNITED STATES PATENT OFFICE 2,362,820

THERMAL RELAY FOR STARTING FLUORESCENT LAMPS

Charles H. Hodgkins, Fairfield, Conn., assignor to The Bryant Electric Company, Bridgeport, Conn., a corporation of Connecticut Application December 16, 1942, Serial No. 469,198

3 Claims. (Cl. 200—122)

The present invention relates to starting relays for fluorescent lamps and particularly to a thermal relay which automatically operates to start such lamps, and, if for any reason the lamp fails to start after a predetermined period of time, the relay also operates to effectively disconnect the failed lamp from the source of supply and is automatically reset upon replacement of the failed lamp.

Relays of this general type are now rather extensively used for the starting of fluorescent lamps and are necessarily subjected to rather critical requirements. For example, in the operation of relays of this type, the heat-responsive element is heated by an electrical resistance heater which must rapidly heat the heat-responsive element to cause operation of the latter with attendant initiation of a discharge in the lamp; and once the lamp has started, such heater must generate just sufficient heat to maintain the heat-responsive element in a predetermined position. This accordingly imposes rather critical resistance characteristics upon the heater element and necessitates accurate testing to confine the resistance of the heaters to narrow tolerance limits.

When the lamp becomes defective and fails to start after a few repetitious operations of the relay, the heater is again subjected to full line voltage with the relay being operable to "lock-out" the defective lamp. However, while the heater operates satisfactorily at line voltage for starting, sustained line voltage on the heater when "locking-out" a defective lamp naturally imposes a load that shortens to a great extent the useful life of the relay.

It is accordingly an object of the present invention to provide a thermal relay for the starting of fluorescent lamps which performs a sequential operation to start the lamp, and if the latter fails to start for any reason after a predetermined interval of time, such relay automatically operates to effectively disconnect the lamp from the source of supply or "lock-out" the lamp without the useful life of the relay being in any way impaired during its normal or "lock-out" operation.

Another object of the present invention is the provision of a thermal relay for the starting of fluorescent lamps which automatically operates to disconnect a failed lamp from the supply source or "lock-out" the defective lamp and which is automatically reset upon replacement of the lamp with such relay being efficiently operable over a long useful life.

A further object of the present invention is the provision of a thermal relay for the starting of fluorescent lamps wherein a resistance heater of low ohmic value is employed to initially operate the relay with a resistance heater element of high ohmic value being employed to maintain the relay in a predetermined position during operation of the lamp; and, should the latter fail to start after a predetermined period of time, a further high resistance heater is rendered effective by operation of the relay to cause the latter to "lock-out" the defective lamp, thus providing an efficient relay having a relatively long commercially useful life.

Still further objects of the present invention will become apparent to those skilled in the art by reference to the accompanying drawings wherein:

Fig. 1 is a sectional view of the relay unit of the present invention and showing a front elevational view of the relay itself;

Fig. 2 is a fragmentary sectional view of the relay taken on the line II—II of Fig. 1 at 90° to the latter and showing the normal or lamp-starting position of the relay prior to its operation;

Fig. 3 is a sectional view taken on the line III—III of Fig. 1;

Fig. 4 is a sectional view taken on the line IV—IV of Fig. 1, but showing the position of the relay in the lamp-operating position;

Fig. 5 is a side view of the relay somewhat similar to Fig. 4, but showing a position which the relay takes provided the lamp does not start upon initial operation of the relay;

Fig. 6 is a view similar to Fig. 4 but showing the relay in the "lock-out" position in which it effectively disconnects the fluorescent lamp from the source of supply after several repetitious operations of the relay in the event the lamp becomes defective for any reason and fails to start;

Fig. 7 is a schematic diagram of the electrical circuit arrangement of the relay in its position as shown in Fig. 1 for the starting of a fluorescent lamp;

Fig. 12 is a sectional view of still another modification of the relay unit of the present invention and showing a front elevational view of the relay itself of this modification;

Fig. 13 is a fragmentary sectional view of the relay of this modification taken on the line XIII—XIII of Fig. 12 at 90° to the latter and showing the normal or lamp-starting position of the relay of this modification prior to its operation;

Fig. 14 is a sectional view taken on the line XIV—XIV of Fig. 12;

Fig. 15 is a schematic diagram of the electrical circuit arrangement of this modification in its position as shown in Fig. 13 for the starting of a fluorescent lamp;

Fig. 16 is a schematic showing of the position of the relay elements of this modification in the lamp-operating position;

Figure 8:
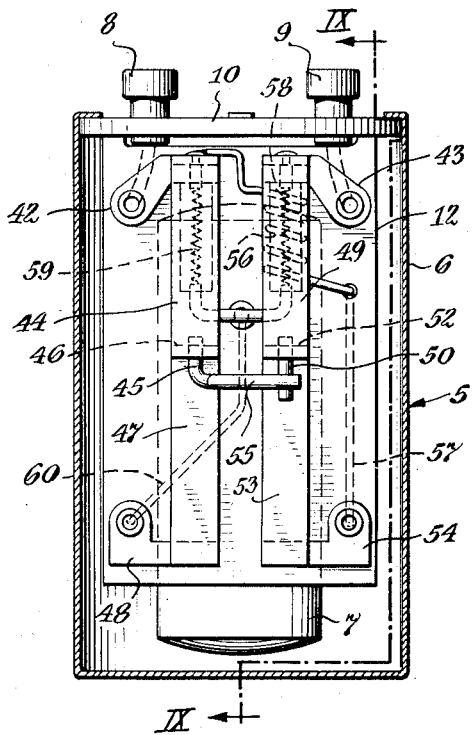
Fig. 8 is a sectional view of a modification of the relay unit of the present invention and showing a front elevational view of a modification of the relay itself.

Fig. 17 is a schematic showing similar to Fig. 16 illustrating the position of the relay elements of this modification in the event the fluorescent lamp does not start upon initial movement of the relay elements, and Fig. 18 is a schematic showing similar to Fig. 16 but with the relay elements of this modification in their position for locking out a fluorescent lamp in the event the latter becomes defective.

Referring now to the drawings in detail, the starting relay 5 of the present invention is housed within a metallic or plastic casing 6 together with a radio-frequency-suppressing condenser 7, both of which are connected in electrical parallel to a pair of socket terminals 8 and 9 adapted to engage a socket and which are secured to an insulating closure member 10.

The relay itself comprises a base 12 of suitable insulating material such as fiber, a phenolic condensation product, hard rubber or the like, and, as shown in Fig. 1, this base is provided with a pair of brackets 13 and 14 each of which supports a heat-responsive element in the form of substantially J-shaped bimetallic contact arms 15 and 16, as can be better seen in Fig. 2. It will be noted from these latter figures that these bimetallic contact arms are formed of two sections. Each section is bimetallic but reversed relative to each other so that with the curved portion, the high expansion metal is on the underside; whereas on the straight portion, the high expansion metal is on the upper side, which thus compensates for changes in ambient temperature. A high ohmic resistance heater 17 is mounted on the base 12 and disposed on the inside bend of the heat-responsive element 15 so as to be partially surrounded by the latter, and in a similar manner an additional high ohmic resistance heater 18 is supported by the base 12 and partially surrounded by the heat-responsive element 16.

One end of the heater 18 is connected by a rod-like conductor 19 to the socket terminal 9, while its remaining end is connected to the bracket 14 to which one end of the other high resistance heater 17 is also connected, with the remaining end of this latter heater 17 being connected to the bracket 13. The free end of the heat-responsive element or bimetallic contact arm 16 is normally in engagement with the rod-like conductor 19 which, as before mentioned, connects with the socket terminal 9. A contact 20 is carried by the free end of the heat-responsive element or bimetallic contact arm 15 and, in the normal or lamp-starting position of the relay, such contact engages a stationary contact 22 secured to a support 23 extending from the base 12. This latter support is connected by a conducting strip 24 to one end of a low ohmic resistance heater 25 surrounded by a ceramic tube 26, the latter of which serves to provide thermal mass, as hereinafter more fully explained.

The remaining end of low resistance heater 25 is connected by a conducting strip 27 to the socket terminal 9, and the bracket 13 is connected by a similar conducting strip 28 to the other socket terminal 8. An additional stationary contact 29 is secured to a support 30 extending from the base 12 and positioned so as to be engaged by the movable contact 20 with such support 30 being connected by a conducting strip 32 to the conducting strip 27 and hence directly to the socket terminal 9. It will also be noted that the base 12 is provided with an opening 33 so that the low resistance heater 25 together with its surrounding ceramic tube 26 is disposed in close proximity to the J-portion of the bimetallic contact arm 15. Accordingly, the heat generated by heater 25 and accumulated in the thermal mass comprising the ceramic tube 26 will readily influence the arm 15, causing deflection thereof.

By reference now more particularly to Fig. 7, it will be noted that upon closure of a switch 34, a circuit is completed to the filamentary electrodes 35 and 36 of a fluorescent lamp 37 by the relay 5 when in its normal or lamp-starting position as shown in Fig. 2. For example, such circuit extends from one side L1 of the source of supply of the usual domestic potential of 115–230 volts to one end of the filamentary electrode 35 and from the remaining end of this electrode to one terminal 8 of the relay, then from the remaining relay terminal 9 to one end of filamentary electrode 36 and from the other end of the latter through an inductance element 38 to the other side of the supply source L2.

This accordingly applies substantially the full voltage of the source of supply across the terminals 8 and 9 of the relay. Considering now the path of current flow through the relay itself at the instant the switch 34 is closed, it will be noted that it flows from terminal 8 through conducting strip 28 to bracket 13, thence through heat-responsive or bimetallic arm 15, normally closed contacts 20 and 22, support 23 and conducting strip 24 and low resistance heater 25 back to socket terminal 9 by the conducting strip 27. Preheating current is accordingly supplied to the lamp electrodes 35 and 36 and at the same time series-connected heater 25 generates heat. This heat influences the J-portion of bimetallic arm 15, causing the free end thereof to deflect away from the base 12, thus separating the normally closed contacts 20 and 22.

Upon separation of these latter contacts, the low resistance path between the lamp electrodes 35 and 36 is interrupted as well as the series circuit for the low resistance heater 25, and the resulting inductive voltage surge from the inductance 38 should initiate a discharge between the preheated electrodes 35 and 36 of the lamp 37. At the moment of disengagement of the contacts 20 and 22 the short-circuit condition of high resistance heater 17 is removed and the same accordingly becomes operatively connected between the socket terminals 8 and 9 through the bimetallic arm 16. This accordingly subjects the high resistance heater 17 to lamp-operating voltage and causes the heater to generate just sufficient heat to maintain the contacts 20 and 22 in a separated position, as shown in Fig. 4, so long as the lamp 37 is operating.

If, however, the lamp 37 fails to start upon initial separation of the contacts 20 and 22, the high resistance heater 17 is immediately subjected to lamp-starting voltage and the resultant increased heat developed at the J-portion will cause bimetallic arm 15 to deflect still further until contact 20 engages stationary contact 29, as shown in Fig. 5. Such engagement not only short-circuits the high resistance heater 17, but again completes a path for the filamentary lamp electrodes 35 and 36 having substantially no resistance. The generation of heat by heater 17 having ceased upon engagement of contacts 20 and 29, the bimetallic arm 15 cools and moves in the direction of the base 12, thus breaking the engagement of the contacts 20 and 29 again causing an inductive voltage surge from the inductance 38 which should initiate a discharge in the lamp 37 and subjecting the high resistance heater 17 once more to lamp-operating voltage to maintain the contacts in the position shown in Fig. 4.

In the event the lamp 37 becomes defective, such as by deactivation of its electrodes 35 and 36, the relay will perform a number of repetitious operations, as above noted, with the contact 20 making and breaking engagement with the stationary contact 29. Each time a break occurs, the high resistance 17 will be subjected to lamp-starting voltage and the heat generated will be accumulative. During such repetitious operation a certain amount of heat will flow from the high resistance heater 17 through the conductor leads (extending to the bracket 14) to the high resistance heater 18 which during normal operation of the relay has been inoperative due to short-circuiting by the heat-responsive element or bimetallic contact arm 16. This conducted heat, together with radiated heat due to the close proximity of high resistance heater 17 to the J-portion of bimetallic arm 16, will finally influence the latter sufficiently to cause its free end to deflect and separate from conductor 19, as shown in Fig. 6, thus removing the short-circuit condition of high resistance heater 18.

Upon the occurrence of this condition high resistance heaters 17 and 18 are thus connected in electrical series and subject to lamp-starting or line voltage. Heat developed by resistance heater 18 will accordingly maintain bimetallic arm 16 separated from conductor 19 and the heat developed by resistance heater 17 will maintain bimetallic arm 15 between stationary contacts 22 and 29 as shown in Fig. 6, since the latter heater does not now receive full line voltage but a voltage comparable to lamp-operating voltage by virtue of its series connection with the resistance heater 18. Also, since the only current path between the lamp electrodes 35 and 36 is through the series-connected high resistance heaters 17 and 18, the current flow will be negligible, thus eliminating incandescence of the lamp electrodes or lamp flickering.

Figure 9:
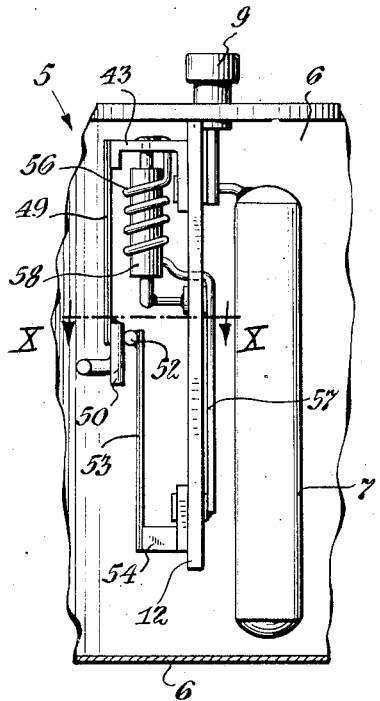
Fig. 9 is a fragmentary sectional view of the modification of the relay taken on the line IX—IX of Fig. 8 at 90° to the latter and showing the normal or lamp-starting position of this modification prior to its operation.
Figure 10:
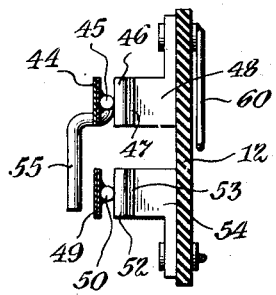
Fig. 10 is a sectional view taken on the line X—X of Fig. 9.

In the modification shown in Figs. 8 to 10, inclusive, the relay is again housed within the casing 6 together with a radio-frequency-suppressing condenser 7 in the same manner as previously described. In order to compensate for changes in ambient temperature, all of the contacts are carried by bimetallic elements. For example, the base 12 is again provided with brackets 42 and 43 with such brackets being connected respectively to the socket terminals 8 and 9. A bimetallic contact arm 44 is supported at one end by a bracket 42, and its depending end is provided with a contact 45 normally engaging a contact 46 carried by the free end of another bimetallic contact arm 47, the latter of which is secured to a bracket 48 anchored to the base 12.

In a similar manner, a bimetallic contact arm 49 has one end thereof secured to the bracket 43 and its depending end is provided with a contact 50 normally engaging a contact 52 carried by a further bimetallic arm 53 secured to a bracket 54 extending from the base 12.

It will thus be seen that the bimetallic contact arms 44 and 47 are in longitudinal alignment, as are the bimetallic contact arms 49 and 53. It will also be noted that the bimetallic contact arm 44 is provided with an angularly disposed contact member 55 which extends over adjacent the contact 50 carried by the bimetallic contact arm 49 so that the angular contact 55 is in the path of deflection of the contact 50, as hereinafter more fully described.

A low resistance heater element 56 is disposed immediately in back of the bimetallic contact arm 49 and one end of this low resistance heater is connected to the bracket 42 and thus to one end of the bimetallic contact arm 44, as well as the socket terminal 8. The remaining end of this low resistance heater is connected by a conductor 57 to the bracket 54 and thus to one end of the bimetallic contact arm 53, and since the contact 52 carried by the latter normally engages the contact 50 carried by the bimetallic contact arm 49 with this latter supported by the bracket 43 which in turn is connected to the socket terminal 9, a circuit is normally completed from the socket terminal 8 through the heater to the socket terminal 9.

In addition, a high resistance heater element 58 is likewise disposed in juxtaposition to the bimetallic contact arm 49 and, in fact, may constitute a core for the low resistance heater element 56. One end of this high resistance heater element 58 is connected to the bracket 43, while its other end connects to one end of a second high resistance heater element 59 disposed in juxtaposition to the bimetallic contact arm 44 with the remaining end of this latter high resistance heater being connected to the bracket 42. A conductor 60 extends from the bracket 48 and connects to one end of each of the high resistance heater elements 58 and 59.

Figure 11:
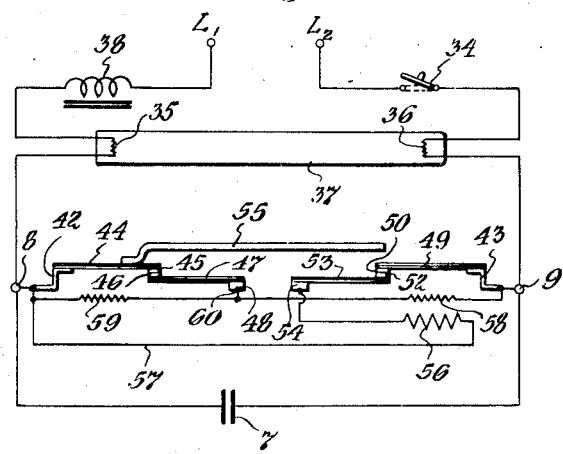
Fig. 11 is a schematic diagram of the electrical circuit arrangement of this modification of the relay in its position as shown in Fig. 9 for the starting of a fluorescent lamp.

By reference now more particularly to Fig. 11, it will be noted that so far as the circuit arrangement for the fluorescent lamp 37 is concerned, it is identical to that previously described with respect to Fig. 7; and since the only difference is in the relative position of the various parts of the relay itself, description of the operation will accordingly be confined more or less to the relay per se of this modification.

Upon closure of the switch 34 the relay of this modification will be in the position as shown in Fig. 11. Thus a circuit will be completed from the socket terminal 8 through the low resistance heater element 56, through the bimetallic contact arm 53, the normally closed contacts 50, 52 and the bimetallic arm 49 through the bracket 43 to the socket terminal 9. The heat generated by heater 56 will accordingly heat the bimetallic contact arm 49, causing deflection of the latter with attendant separation of the contacts 50 and 52.

Upon separation of these contacts, a high voltage surge is impressed across the lamp electrodes 35 and 36 in the manner previously described to initiate a discharge between these preheated lamp electrodes. Separation of the contacts 50 and 52 accordingly interrupts the circuit to the low resistance heater element 56 and lamp-operating voltage will be impressed on high resistance heater element 58 which generates just sufficient heat to maintain the bimetallic contact arm 49 in its initial deflected position, in the same manner as previously described with reference to the relay as shown in Figs. 1 to 7, inclusive.

In the event, however, that separation of the contacts 50 and 52 does not initiate a discharge between the preheated electrodes 35 and 36, the high resistance heater 58 will immediately be subjected to line or lamp-starting voltage with an increase in the heat generated thereby, which will cause still further deflection of the bimetallic contact arm 49 until the contact 50 engages the angularly disposed contact 55 connected to the bimetallic contact arm 40. This will accordingly complete another low resistance circuit to the lamp electrodes 35 and 36 which extends from the socket terminal 8 through the bracket 42, bimetallic contact arm 44 and contact 55, to the contact 50 now engaging the contact 55, and thence through bimetallic contact arm 49 and bracket 43 to the socket terminal 9. Engagement of the contact 50 with the contact 55 thus short-circuits the high resistance heater element 58, causing the bimetallic contact arm 49 to cool. Upon cooling of the bimetallic contact arm 49, the contact 50 carried thereby will disengage the contact 55, again interrupting the heating circuit for the lamp electrodes 35 and 36, causing a high voltage surge from the inductance 38 which should again initiate a discharge between the preheated electrodes 35 and 36.

If, on the second attempt, a discharge is not initiated, the short-circuit condition of the high resistance heater element 58 is immediately removed, again causing the heat generated thereby to deflect the bimetallic contact arm 49 until its contact 50 again engages the contact 55 and thus through several cycles until a discharge is finally initiated between the lamp electrodes 35 and 36. If, however, the lamp 37 has become defective due to deactivation of the electrodes 35 and 36, the high resistance heater 58 will accordingly be subjected to lamp-starting or line voltage with such heat becoming accumulative until such heat is transmitted both by radiation and conduction to the high resistance heater element 59, which latter will attain a temperature sufficient to influence the bimetallic contact arm 44 so that it is deflected, thus separating the contacts 45 and 46.

Disengagement of these latter contacts 45 and 46 accordingly removes the former short-circuit condition of the high resistance heater 59, thus effectively connecting the latter in series relationship with the high resistance heater 58. Thus sufficient heat is generated by the high resistance heater element 59 to maintain the bimetallic arm 44 in a deflected position with separation of the contacts 45 and 46 and, since lamp-starting or line voltage is divided between the high resistance heater 59 and high resistance heater 58, the latter generates heat comparable to lamp-operating conditions so that this latter heater maintains the bimetallic arm 49 in its initially deflected position with the contact 50 disposed between the contacts 52 and 55 out of engagement with both.

Accordingly, the defective lamp 37 is "locked-out" with very little current flowing through the lamp electrodes 35 and 36 so that the latter are not heated to any observable glow and naturally no flickering of the lamp results, since the relay is so conditioned that no high voltage surge is impressed across the electrodes in a futile attempt to initiate a discharge.

From the foregoing it will be seen that this modification differs from that previously described with respect to Figs. 1 to 7, inclusive, only in the provision of additional bimetallic contact arms 47 and 53 which thus places all contacts on bimetallic arms, and the further difference that contact 55 is carried by the bimetallic contact arm 54 instead of such contact being connected directly to one of the socket terminals 8 or 9, as is the case in the previously described modification shown in Figs. 1 to 7.

In Figs. 12 to 18, inclusive, a still further modification is shown which incorporates substantially the structure shown in both of the previously described modifications. In other words, the structure of this latter modification includes the compensating bimetals of the modification shown in Figs. 8 to 11, inclusive, as well as the U-shaped bimetallic contact arms shown and described relative to the modification of Figs. 1 to 7, inclusive.

Referring now more specifically to this latter modification, it will be noted that the relay 5 is again housed in a casing 6, the latter of which is again provided with socket terminals 8 and 9 as previously described. Again the socket terminals 8 and 9 are connected respectively to a pair of brackets 62 and 63. A U-shaped bimetallic contact arm 64 is welded or otherwise secured to the bracket 62 and at its lower or depending end is provided with a contact 65 which normally engages the contact 66 carried by a U-shaped bimetallic element 67 secured to a bracket 68 affixed to the base 12.

In a similar manner a further U-shaped bimetallic element 69 is welded or otherwise secured to the bracket 63 and its depending end is provided with a contact 70 normally engaging a contact 72 carried by a still further U-shaped bimetallic contact arm 73 welded or otherwise secured to a bracket 74 affixed to the base 12. An angularly disposed contact 75 is welded or otherwise affixed to the bimetallic contact arm 64 and extends transversely of the relay adjacent the free end of the bimetallic contact arm 69 so as to be engaged by the depending arm of the latter in the same manner as previously described with respect to the contact arm 55 and its engagement by the contact 50 carried by the bimetallic arm 49 of the modification of Fig. 8.

Again a low resistance heater element 76 is disposed in juxtaposition to the base of the U-shaped bimetallic contact arm 69, which heater has one end connected to the bracket 62 and thus to the socket terminal 8, while its remaining end is connected by a conductor 77 to the bracket 74. A high resistance heater element 78 again may form a core for the low resistance heater 76 and is thus disposed in juxtaposition to the base of the U-shaped bimetallic contact arm 69 with one end of this high resistance heater element 78 being connected to the bracket 63 while its remaining end connects to one end of a further high resistance heater element 79 with the remaining end of the latter being connected to the bracket 62. Also, a conductor 80 extends from the bracket 68 and connects at a point between the adjacent ends of the high resistance heater elements 78 and 79 in the same manner as previously described with respect to the modification of Figs. 8 to 11.

By reference now to Fig. 15 it will be noted that upon closure of the switch 34 the relay of this modification will be in the position as shown in this figure which is identical to that previously described with respect to Fig. 11. For example, the starting circuit for the lamp 37 will include the low resistance heater element 76 which extends from the socket terminal 8 through the low resistance heater 76, bimetallic contact arm 73, normally closed contacts 70 and 72 and bimetallic arm 69, through bracket 63 to the terminal 9. This accordingly heats the bimetallic arm 69, causing it to deflect and the contacts 70 and 72 to separate, assuming the position shown in Fig. 16. Separation of these contacts causes a high voltage surge from the inductance element 38 which should initiate a discharge between the preheated electrodes 35 and 36 of the lamp 37. This will accordingly subject the high resistance heater 78 to lamp-operating voltage which thus causes this heater to generate just sufficient heat to maintain the bimetallic contact arm 69 in its initially deflected position, as shown in Fig. 16.

In the same manner as previously described, should the lamp fail to start upon initial separation of the contacts 70 and 72, lamp starting or line voltage will be impressed on the high resistance heater 78, causing the heat generated thereby to deflect the bimetallic contact arm 69 still further until its free end engages the angularly disposed contact 75, as shown in Fig. 17, which again completes a low resistance heater circuit to the lamp electrodes 35 and 36 from the contact terminal 8 through the bimetallic contact arm 64, contact 75, bimetallic contact arm 69 to the socket terminal 9. Engagement of the free end of the bimetallic contact arm 69 with the contact 75 thus short-circuits the high resistance heater 78, and after a short period of time the bimetallic arm 69 will cool with its free end disengaging the contact 75, which will again cause a high voltage surge from the inductance 38 which should again initiate a discharge between the preheated electrodes 35 and 36. When such discharge is initiated, the high resistance heater 78 is again subjected to lamp-operating voltage in the manner previously described, which will maintain the bimetallic contact arm 69 in the position shown in Fig. 16 with the contact 70 between the contacts 72 and 75.

In the event, however, that the lamp fails to start after a short period of cyclic operation of the relay due to the lamp becoming defective, such as by deactivation of its electrodes 35 and 36, the heat generated by the high resistance heater 78, due to repeated application of lamp-starting or line voltage, will become accumulative. This heat will be transmitted both by radiation and conduction to the high resistance heater element 79 with this latter finally heating the bimetallic contact arm 64, causing deflection thereof and separation of the contacts 64 and 66. This accordingly removes the former short-circuit condition of the high resistance heater 79 and thus effectively connecting the same in electrical series with the high resistance heater 78.

Lamp starting or line voltage is thus substantially divided between these two high resistance heaters 78 and 79 with the result that the heater 79 maintains the contact arm 64 and the high resistance heater 78 maintains the bimetallic contact arm 69 in the position as shown in Fig. 18, which is the "lock-out" position of the relay. The fluorescent lamp 37 is accordingly effectively disconnected from the circuit, thus eliminating flickering of the latter and any observable glow of the electrodes 35 and 36. Upon removal of the defective lamp and replacement by a new lamp, the relay will automatically assume its normal position as shown in Figs. 12, 13, and 15.

It thus becomes obvious to those skilled in the art that a thermal relay for starting fluorescent lamps is herein provided wherein the relay performs a sequential operation to start the lamp; and if the latter fails to start for any reason after a predetermined period of time, such relay automatically operates to "lock-out" the defective lamp. Moreover, by the provision of a low ohmic resistance heater to initiate operation of the relay which is automatically open-circuited at the same time a high ohmic resistance heater is operably connected to the circuit for maintaining the relay in the lamp-operating position, the commercially useful life of the relay is considerably prolonged. Also, by the provision of a further high ohmic resistance heater operable to "lock-out" a defective lamp, which high resistance heater is automatically connected in series with the other high resistance heater under failed lamp conditions, the useful life of the relay is still further enhanced.

Although several specific embodiments of the present invention have been shown and described, it is to be understood that still further modifications thereof may be made without departing from the spirit and scope of the appended claims.

I claim:

1. A relay for starting an electric discharge lamp from a source of electrical energy comprising a base, a heat-responsive element carried by said base, an electic heater disposed in heat transfer relation to said heat-responsive element for causing movement of the latter upon the flow of current through said heater, circuit-controlling means operable in response to movement of said heat-responsive element upon the application of approximately line voltage to said heater to interrupt the circuit to said lamp and to said heater and cause the initiation of a discharge in said lamp, a second electric heater operably connected in the circuit with said lamp upon initial movement of said heat-responsive element and operable upon the application of lamp-operating voltage thereto to heat said heat-responsive element sufficiently to maintain the latter in the position to which it is initially moved, and said second electric heater being operable upon the application of approximately line voltage thereto in the event a discharge is not initiated in said lamp to move said heat-responsive element and cause said circuit-controlling means to momentarily complete a circuit to said lamp independently of either of said electric heaters, and a normally short-circuited third electric heater adapted to be connected in series with said second electric heater upon the application of approximately line voltage to the latter for a predetermined period of time due to said lamp becoming defective and operable to reduce current flow through said second electric heater to cause the latter to maintain said heat-responsive element substantially in the position to which it was initially moved until replacement of the defective lamp.

2. A relay for starting an electric discharge lamp from a source of electrical energy comprising a base, a bimetallic element carried by said base, an electric heater disposed in heat transfer relation to said bimetallic element for causing deflection of the latter upon the flow of current through said heater, circuit-controlling means normally completing a circuit to said lamp and to said heater and operable in response to deflection of said bimetallic element upon the application of approximately line voltage to said heater to disconnect the latter from said circuit and cause the initiation of a discharge in said lamp, a second electric heater operably connected in circuit with said lamp simultaneously with disconnection of said first mentioned heater upon initial deflection of said bimetallic element and operable upon the application of lamp-operating voltage thereto to heat said bimetallic element sufficiently to maintain the latter in its initially deflected position, and said second electric heater being operable upon the application of approximately line voltage thereto in the event a discharge is not initiated in said lamp to deflect said bimetallic element still farther and cause said circuit-controlling means to complete a circuit to said lamp and simultaneously short-circuit said second electric heater, a third electric heater, a second bimetallic element normally short-circuiting said third electric heater and heated by said second electric heater upon the application of approximately line voltage to the latter for a predetermined period of time due to said lamp defective and operable to deflect and connect said third electric heater in series with said second electric heater to reduce the voltage on the latter and maintain said first mentioned bimetallic element in its initially deflected position, and said third electric heater being operable to maintain said second bimetallic element in its deflected position until replacement of the defective lamp.

3. A relay for starting an electric discharge lamp from a source of electrical energy comprising a base, a bimetallic element carried by said base, a low resistance electric heater disposed in heat transfer relation to said bimetallic element for causing deflection of the latter upon the flow of current through said heater, circuit-controlling means normally completing a circuit to said lamp and to said heater and operable in response to deflection of said bimetallic element upon the application of approximately line voltage to said low resistance heater to disconnect the latter from said circuit and cause the initiation of a discharge in said lamp, a high resistance electric heater operably connected in circuit with said lamp, simultaneously with disconnection of said first mentioned heater upon initial deflection of said bimetallic element and operable upon the application of lamp-operating voltage thereto to heat said bimetallic element sufficiently to maintain the latter in its initially deflected position, and said high resistance electric heater being operable upon the application of approximately line voltage thereto in the event a discharge is not initiated in said lamp to deflect said bimetallic element still farther and cause said circuit-controlling means to complete a circuit to said lamp and simultaneously short-circuit said high resistance heater, a second high resistance heater, a second bimetallic element normally short-circuiting said second high resistance heater and heated by said first-mentioned high resistance heater upon the application of approximately line voltage to the latter for a predetermined period of time due to said lamp becoming defective and operable to deflect and remove the short-circuit of said second high resistance heater simultaneously with connection of the latter in series with said first mentioned high resistance heater to reduce the voltage on the same and maintain said first mentioned bimetallic element in its initially deflected position, and said second high resistance heater being operable to maintain said second bimetallic element in its deflected position until replacement of the defective lamp.

CHARLES H. HODGKINS.